Nov. 6, 1956 G. CORNELIUS 2,769,664
APPARATUS TO AID THE MOVING OF PIPE LINES
Filed Aug. 31, 1953 2 Sheets-Sheet 2
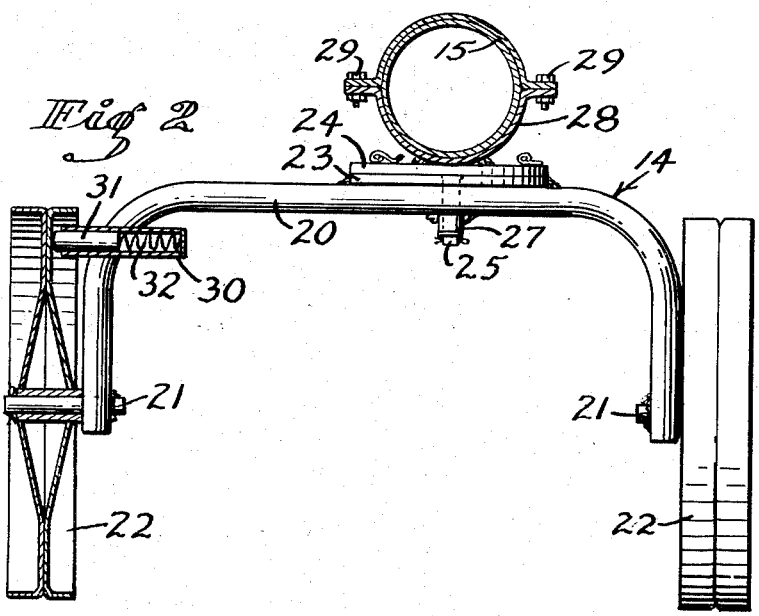
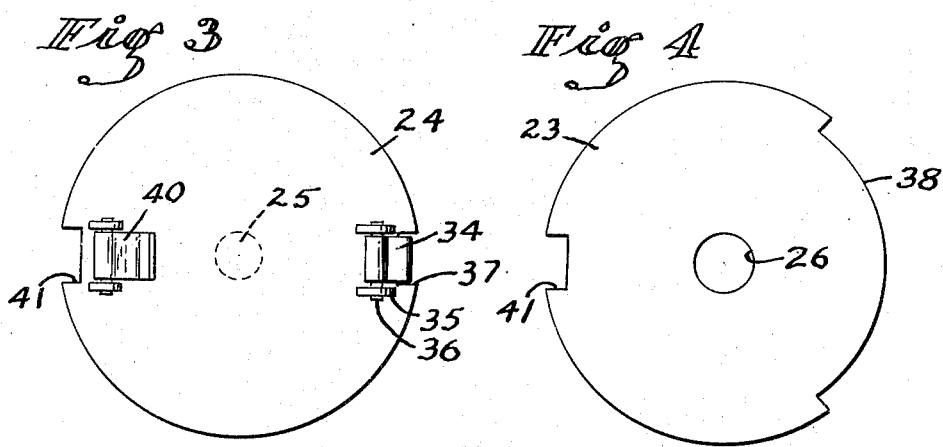
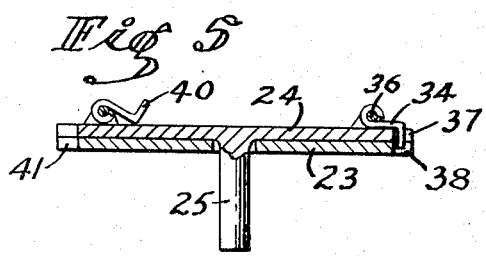
INVENTOR
GAIL CORNELIUS
BY
Charles M. Fryer
ATTORNEY

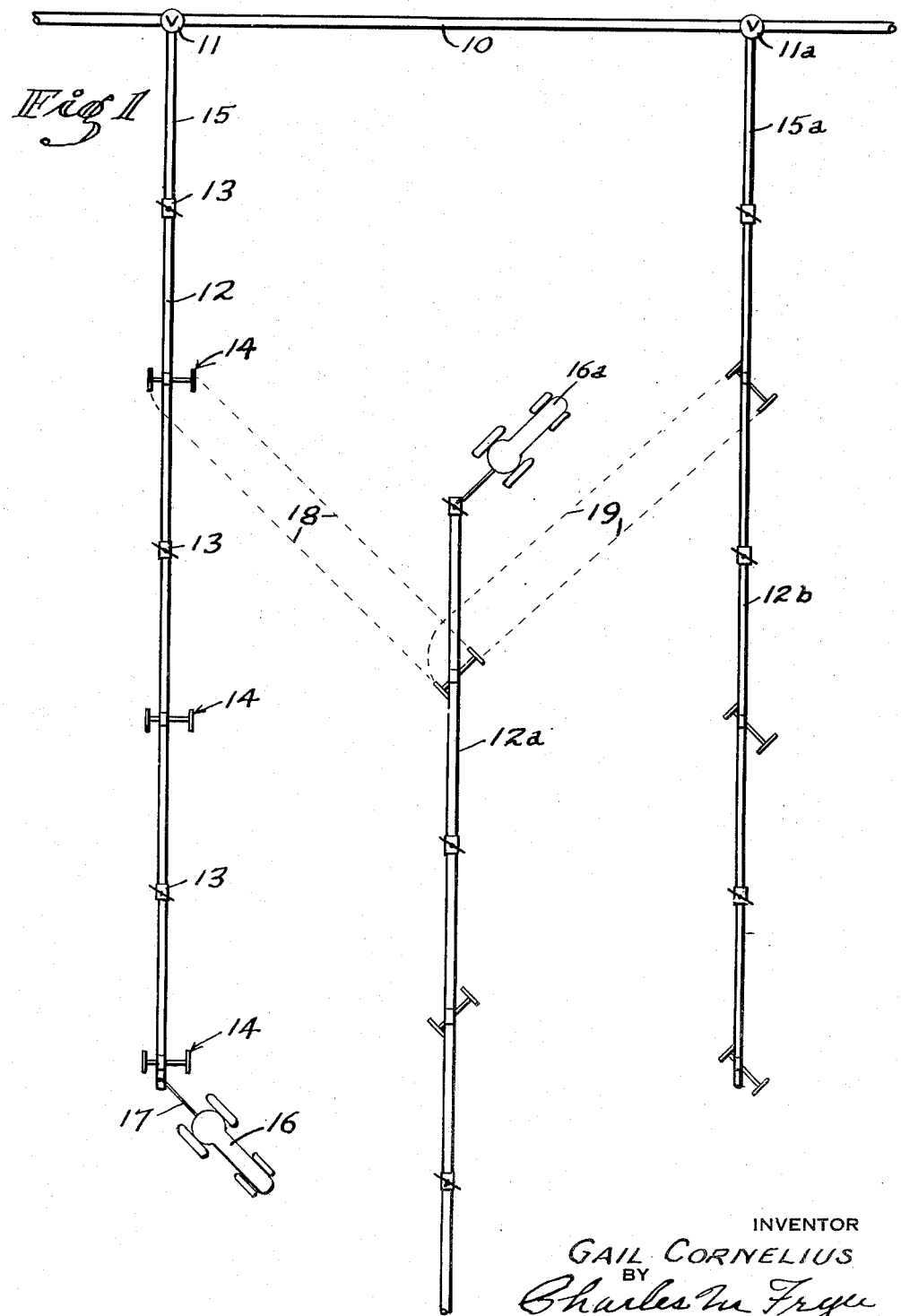

United States Patent Office 2,769,664
Patented Nov. 6, 1956

2,769,664

APPARATUS TO AID THE MOVING OF PIPE LINES

Gail Cornelius, Portland, Oreg., assignor to R. M. Wade & Co., Portland, Oreg., a corporation of Oregon Application August 31, 1953, Serial No. 377,415

4 Claims. (Cl. 299—47)

This invention relates to the moving of pipe lines and particularly to apparatus for moving a line from one position to another position parallel thereto as is customary, for example, in the operation of sprinkler-type irrigation systems.

Various methods have been devised for moving a long sprinkler line without the necessity of uncoupling the several lengths of pipe which make up the line. One such method includes the use of wheels mounted in pairs on axles secured transversely of the pipe. In this method, the wheels roll parallel to the length of the pipe so that the pipe may be pulled longitudinally from one end. Difficulties are presented, however, when the pipe is moved from one straight line position to another parallel straight line position. For example, the pipe must be drawn through an arc or curved path from one position to the next so that its ends become displaced and the pipe cannot be reconnected to a main line without considerable trouble.

It is the object of the present invention to provide a wheel mounting for a pipe line that will enable the line to be moved between two parallel positions by a pull exerted from one end of the line and without drawing the line through a curve or arc. A further object of the invention is to provide a mounting for a pipe line comprising sets of wheels in the form of dollies or casters that are pivoted relative to the line and arranged to swing about their pivots automatically when an endwise pull is exerted to cause the line to move in a straight condition from one position to a second and parallel position.

Further objects and advantages of the invention and the manner in which the invention is practiced are set forth in the following specification wherein reference is made to the accompanying drawings.

In the drawings:

Fig. 1 is a schematic view in plan of a main irrigation line showing a lateral line in three positions as it would appear during its movement from one operating position to another in accordance with the present invention, Fig. 2 is a view in end elevation and with parts in section of a dolly or caster constructed in accordance with the present invention, Fig. 3 is an enlarged plan view of a top bearing plate and latch mechanism which forms a part of the caster shown in Fig. 2, Fig. 4 is a similar view of a bottom bearing plate, and Fig. 5 is a central transverse section of the bearing plates shown in Figs. 3 and 4 illustrated in their assembled position.

In Fig. 1 of the drawings, the entire sheet represents a portion of a field to be irrigated and as is customary, a main line, a short section of which is illustrated at 10, is disposed along one edge of the field. This main line has a plurality of valved outlets such as indicated at 11 and 11a and a lateral line 12 is connected to one of the outlets 11 so that water under pressure flows through the main line and lateral 12. Sprinklers indicated at 13 distribute the water over the surface of the field in overlapping circular patterns. When sufficient water has been placed on the field in this manner, the lateral 12 is disassembled and moved to the next valve outlet as for example that shown at 11a. In the present drawing, the lateral 12 is shown as being very short for the purpose of illustration but in practice such laterals are often a thousand feet or more in length and considerable labor is involved in moving the lateral from one valved outlet to the next some sixty feet away.

With ordinary wheels supporting the pipe for longitudinal movement over the ground, a tractor may be connected to one end of the pipe and due to the flexibility of the long lateral pipe line, it may be drawn from one valve outlet to the next but it is not left in a parallel position or in a close proximity to the valved outlet to which it must be connected. The present invention includes casters generally indicated at 14 each of which consists of a pair of wheels mounted on an axle or frame connected for limited pivotal movement to the lateral pipe line so that they will swing automatically to a diagonal position with respect thereto causing the pipe line to move diagonally toward its new position without curving and without being displaced angularly from its normal or parallel position as it is being moved.

For example referring to Fig. 1, it may be assumed that the lateral 12, connected to the valved outlet 11, has been operated for sufficient time and is to be moved to the outlet 11a. First the lateral 12 is disconnected from the main line preferably by breaking the joint between the first sprinkler coupling 13 and a section of conduit 15 which, if desired, may be flexible or telescoping to accommodate for slight variations in the position of the lateral. A tractor, such as illustrated at 16, is then connected to the far end of the line by a light rope or the like, such as indicated at 17, and the line is pulled by the tractor in a diagonal direction which is approximately 45° from the center line of the pipe itself. Since the casters are pivotally connected with the pipe and limited to swing approximately 45° away from normal in either direction, the initial movement of the pipe will result in this swinging movement, through mechanism presently to be described, and the pipe will be drawn to the position illustrated at 12a in Fig. 1. At this time the tractor is disconnected from the distant end of the lateral line and is moved to the proximal end where it is shown at 16a and here it is employed to pull the pipe in a direction at 90° to the first movement. The casters 14 which have previously rolled along the dotted path, indicated at 18, now reverse their position and follow the path 19 so that the final position of the pipe is that illustrated at 12b and the lateral line is connected to the valved outlet 11a with the conduit 15 which has now been moved to the position 15a. Since the pipe has been moved along two diagonal paths, its proximal end assumes a position the same distance from the outlet 11a as it had assumed with respect to the outlet 11. This of course is a great advantage over the old method of moving the pipe where it was pulled from the first position to the second position from one end only leaving its proximal end a considerable distance from the main line and requiring extra lengths of conduits to make the connection.

Furthermore, the apparent disadvantage of having to pull the pipe in two directions is not an actual disadvantage because it is necessary for the operator of the tractor to make the return trip toward the main line after the lateral has been moved, in any event, because he must complete the connection between the moved lateral and open the valve at the outlet 11a. Consequently the tractor has not traveled any additional distance but has simply stopped on the return trip to engage the pipe after it has been moved half way and complete its movement toward the final position shown at 15a.

Now referring to Figs. 2 to 5, inclusive, one of the casters 14 is illustrated as comprising a transverse frame 20, here illustrated as a piece of tubing bent downwardly at its ends and carrying stub axles 21 for the reception of wheels 22. A pair of bearing plates shown at 23 and 24 (see also Figs. 3, 4 and 5) are mounted on top of the frame member 20 to support the pipe 15 which forms the lateral line. The bearing plate 23 is illustrated as welded to the frame 20 and the bearing plate 24 rests on top of the plate 23 for turning movement with respect thereto. A king pin 25 extends downwardly from the center of the plate 24 through an opening 26 in the plate 23 and a bearing member 27 beneath the frame. One half of a separable clamp 28 is welded or otherwise suitably secured to the bearing plate 24 and the separable parts of this clamp embrace the pipe 15 and are secured in place thereon by means of nuts and bolts as illustrated at 29.

In order to compel the caster frame to swing to a diagonal position when the pipe line supported by it is pulled longitudinally, either or both of two methods may be employed. The first method consists in mounting the bearing plates and king pin toward one side of the frame, rather than centrally in the conventional manner, so that the inertia and frictional resistance to movement of one of the wheels 22 imposes a greater turning force than the other and causes the caster frame to swing as soon as the pipe starts to move. The other method is to apply a brake or added frictional resistance to the movement of one of the wheels 22. A simple means of braking the action of one wheel is shown in Fig. 2 where a short tube 30 is illustrated as welded or otherwise secured to the frame 20. This tube 30 contains a braking member such as a small wooden plunger 31 slidably disposed in the tube and arranged to bear against a portion of the wheel which, as illustrated, is spokeless or disc-like in shape. A spring 32 is disposed in the tube 30 and urges the braking member 31 against the wheel with just sufficient force to retard its movement so that the wheel will tend to remain still during the initial movement of the pipe and until the opposite wheel has swung about the king pin 25 and the frame 20 assumes its desired diagonal position.

To limit the swinging movement of the caster frame to the desired diagonal position which is shown as approximately 45°, a latch member best shown at 34 in Figs. 3 and 5, acts between the bearing plate 24 to which it is secured and the bearing plate 23. This latch member 34 is pivotally mounted as on brackets 35 and a pin 36 and has an end portion normally extending downwardly through a notch 37 in the plate 24 and entering a relieved portion 38 in the periphery of the plate 23. The depending end of the latch will engage the shoulders of the opposite ends of the relieved portion 38 and therefore limit the extent of turning movement between the plates and likewise determine the diagonal position of the caster frame.

It may also be desired to prevent diagonal movement of the caster frame to enable the line to be drawn longitudinally as when it is to be moved from one field to another. In this event, an additional latch, shown in its open position at 40, may be swung to its engaged position where its end enters a notch 41 formed in the edge of the plate 23 to prevent relative turning of the plates 23 and 24 and hold the caster frame in a position normal to the longitudinal axis of the pipe line.

With the construction illustrated, any desired length of pipe line may be moved from one position to a second spaced parallel position by simply pulling it half of the distance desired in one direction and then pulling it the remainder of the distance in the opposite direction. Because of the mounting of the pivoted casters which support the line, these casters automatically assume the required angular relationship with respect to the line each time that it is moved.

As viewed in Fig. 1 the pipe line is illustrated as being moved across a field progressively to the right. It may be desired to irrigate the right side of the field first and move the pipe progressively toward the left. In this event the position of all of the casters may be reversed to produce the opposite effect. With both of the latches 34 and 40 released, the caster frame and lower pivot plate 23 may be swung through an arc of 180°. When all of the casters have been so manipulated, the latches 40 are swung downwardly and cooperate with the relieved areas 38 in the bottom pivot plates in the same manner as previously described in connection with the latches 34.

I claim:

1. A caster for supporting a moveable pipe line which comprises a frame with ground engaging wheels adjacent its opposite ends, a pivotal support on the frame for a pipe line to be moved, and frictional brake means tending to retard the rolling of one wheel more than the other whereby upon movement of the pipe the frame will pivot relative to the pipe and assume a diagonal position with respect thereto.

2. A caster for supporting a moveable pipe line which comprises a frame with ground engaging wheels adjacent its opposite ends, a pivotal support on the frame for a pipe line to be moved, frictional brake means tending to retard the rolling of one wheel more than the other whereby upon movement of the pipe the frame will pivot relative to the pipe and assume a diagonal position with respect thereto and means to limit the pivotal movement of the frame.

3. In an apparatus to aid the moving of a pipe line a plurality of casters supporting the line at spaced intervals and each comprising a frame with ground engaging wheels adjacent its opposite ends, a pivotal support on the frame for a pipe line to be moved, said support being disposed closer to one wheel of the frame than to the other whereby upon movement of the pipe the said other wheel will cause the frame to swing toward a diagonal position and cause the pipe to move in a direction at a diagonal to its longitudinal center line.

4. In an apparatus to aid the moving of a pipe line a plurality of casters supporting the line at spaced intervals and each comprising a frame with ground engaging wheels adjacent its opposite ends, a pivotal support on the frame for a pipe line to be moved, and brake means to impose frictional resistance to the rolling movement of one wheel whereby movement of the pipe line will cause the frame to swing about its pivot and assume a diagonal position relative to the pipe line.

References Cited in the file of this patent

UNITED STATES PATENTS

| 738,271 | Astle | Sept. 8, 1903 |
|---|---|---|
| 1,429,756 | Mitchell | Sept. 19, 1922 |
| 1,601,199 | Clapper | Sept. 28, 1926 |
| 1,809,609 | Turner | June 9, 1931 |
| 1,966,783 | Balaam | July 17, 1934 |
| 2,249,297 | Muffett | July 15, 1941 |
| 2,678,844 | Hondeville | May 18, 1954 |

FOREIGN PATENTS

| 668,800 | Great Britain | Mar. 19, 1952 |